(12) United States Patent
Andersen et al.

(10) Patent No.: US 10,700,624 B2
(45) Date of Patent: Jun. 30, 2020

(54) CONTROL OF A WIND TURBINE GENERATOR FOR REDUCED TONAL AUDIBILITY

(71) Applicant: VESTAS WIND SYSTEMS A/S, Aarhus N (DK)

(72) Inventors: Gert Karmisholt Andersen, Hovedgård (DK); Kent Tange, Ry (DK); Søren Andersen, Tilst (DK); Duy Duc Doan, Tilst (DK); Jens Peter Biltoft, Skanderborg (DK); Lars Helle, Suldrup (DK); John Godsk Nielsen, Hornslet (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/326,988

(22) PCT Filed: Aug. 11, 2017

(86) PCT No.: PCT/DK2017/050261
§ 371 (c)(1),
(2) Date: Feb. 21, 2019

(87) PCT Pub. No.: WO2018/036596
PCT Pub. Date: Mar. 1, 2018

(65) Prior Publication Data
US 2019/0181787 A1    Jun. 13, 2019

(30) Foreign Application Priority Data
Aug. 26, 2016 (DK) .................................. 2016 70657

(51) Int. Cl.
*H02P 9/30* (2006.01)
*H02P 9/02* (2006.01)
(Continued)

(52) U.S. Cl.
CPC .............. *H02P 9/305* (2013.01); *H02M 5/44* (2013.01); *H02M 5/4585* (2013.01); *H02P 9/02* (2013.01);
(Continued)

(58) Field of Classification Search
USPC ....................................... 290/44, 55; 363/16
See application file for complete search history.

(56) References Cited

U.S. PATENT DOCUMENTS 5,570,276 A * 10/1996 Cuk ...................... H02M 3/005
323/266
6,566,764 B2 * 5/2003 Rebsdorf ................ H02P 9/007
290/44
(Continued)

FOREIGN PATENT DOCUMENTS

| WO | 9311604 A1 | 6/1993 |
|---|---|---|
| WO | 2016082834 A1 | 6/2016 |
| WO | 2018036596 A1 | 3/2018 |

OTHER PUBLICATIONS

International Search Report for Application No. PCT/DK2017/050261 dated Mar. 11, 2017.
(Continued)

*Primary Examiner* — Pedro J Cuevas
(74) *Attorney, Agent, or Firm* — Patterson + Sheridan, LLP

(57) ABSTRACT

A method of controlling a wind turbine generator (1) comprising an electrical generator (10) and a power converter (12), the power converter (12) comprising an electrical switch (14a, 14b) that is configured to process electrical power produced by the electrical generator (10), the method comprising: controlling an output from the electrical switch (14a, 14b) using a variable pulse-width modulated control signal, thereby to control characteristics of output power from the power converter (12); acquiring sample data (26)
(Continued)

relating to an electronic signal within the wind turbine generator (1), wherein the sample data (26) is used for controlling the wind turbine generator (1); and dynamically adjusting a frequency (30) at which the sample data is acquired to synchronise data acquisition with a carrier frequency (24) of the control signal.

16 Claims, 3 Drawing Sheets

(51) Int. Cl.
*H02P 101/15* (2016.01)
*F03D 9/25* (2016.01)
*H02M 5/458* (2006.01)
*H02M 5/44* (2006.01)
*H02M 1/00* (2006.01)

(52) U.S. Cl.
CPC ....... *F03D 9/25* (2016.05); *H02M 2001/0012* (2013.01); *H02P 2101/15* (2015.01); *Y02E 10/76* (2013.01)

(56) References Cited

U.S. PATENT DOCUMENTS

| | | | | |
|---|---|---|---|---|
| 6,847,128 B2 * | 1/2005 | Mikhail | ............... | F03D 7/0224 290/44 |
| 6,853,094 B2 * | 2/2005 | Feddersen | ............ | F03D 7/0224 290/44 |
| 6,856,038 B2 * | 2/2005 | Rebsdorf | ............... | H02P 9/007 290/44 |
| 6,856,039 B2 * | 2/2005 | Mikhail | ............... | F03D 7/0224 290/44 |
| 7,095,131 B2 * | 8/2006 | Mikhail | ............... | F03D 7/0224 290/44 |
| 7,291,937 B2 * | 11/2007 | Willisch | ................. | H02P 9/007 290/44 |
| 7,746,671 B2 * | 6/2010 | Radecker | ......... | H02M 3/33507 323/244 |
| 7,969,754 B2 * | 6/2011 | Radecker | ......... | H02M 3/33507 323/244 |
| 8,013,461 B2 * | 9/2011 | Delmerico | ............... | H02P 9/42 290/44 |
| 8,030,791 B2 * | 10/2011 | Lang | ................... | H02M 5/4505 290/43 |
| 8,106,525 B2 * | 1/2012 | Letas | ....................... | F03D 7/00 290/44 |
| 8,184,456 B1 * | 5/2012 | Jain | ....................... | H02M 5/29 363/21.02 |
| 8,350,397 B2 * | 1/2013 | Lang | ................... | H02M 5/4505 290/44 |
| 8,405,367 B2 * | 3/2013 | Chisenga | ............... | H02J 3/383 323/207 |
| 2002/0079706 A1 * | 6/2002 | Rebsdorf | ............... | H02P 9/007 290/55 |
| 2002/0105189 A1 * | 8/2002 | Mikhail | ............... | F03D 7/0224 290/44 |
| 2003/0021887 A1 | 1/2003 | Graves et al. | | |
| 2003/0071467 A1 | 4/2003 | Calley et al. | | |
| 2003/0128555 A1 * | 7/2003 | Schemmann | ....... | H02M 3/3385 363/16 |
| 2004/0026929 A1 * | 2/2004 | Rebsdorf | ............... | H02P 9/007 290/44 |
| 2004/0094964 A1 * | 5/2004 | Mikhail | ............... | F03D 7/0224 290/44 |
| 2004/0207208 A1 * | 10/2004 | Mikhail | ............... | F03D 7/0224 290/44 |
| 2004/0217596 A1 * | 11/2004 | Feddersen | ............ | F03D 7/0224 290/44 |
| 2005/0253396 A1 * | 11/2005 | Mikhail | ............... | F03D 7/0224 290/44 |
| 2006/0113800 A1 * | 6/2006 | Willisch | ................. | H02P 9/007 290/44 |
| 2006/0285366 A1 * | 12/2006 | Radecker | ......... | H02M 3/33507 363/16 |
| 2009/0243296 A1 * | 10/2009 | Letas | ....................... | F03D 7/00 290/44 |
| 2010/0025995 A1 * | 2/2010 | Lang | ................... | H02M 5/4505 290/44 |
| 2010/0135049 A1 * | 6/2010 | Radecker | ......... | H02M 3/33507 363/21.03 |
| 2010/0295305 A1 * | 11/2010 | Mahawili | ............... | F03D 7/0244 290/44 |
| 2011/0140438 A1 * | 6/2011 | Delmerico | ............... | H02P 9/42 290/55 |
| 2013/0155730 A1 | 6/2013 | Reichard et al. | | |
| 2015/0073610 A1 | 3/2015 | Schnetzka et al. | | |

OTHER PUBLICATIONS

Habetler T G et al: 11 Acoustic Noise Reduction in Sinusoidal PWM Drives Using a Randomly Modulated Carri Er 11 IEEE Tran Sa Cti Ons on Power Electronics, Institute of Elect Ri Cal and Electronics Engineers, USA, vol. 6, No. 3, Jul. 1, 1991.

Trzynadlowski Am et al: "Random pulse width modulation techniques for converter fed drive system—a review ", Industry Applications Society Annual Meeting, 1993., Conference Record of the 1993 IEEE Toronto, Ont., Canada Oct. 2-8, I, New York, NY, USA, IEEE, US, Oct. 2, 1993.

Danish Patent and Trademark Office, First Technical Examination for Application No. PA 2016 70657 dated Feb. 28, 2017.

PCT Written Opinion of The International Searching Authority for Application No. PCT/DK2017/050261.

* cited by examiner

CONTROL OF A WIND TURBINE GENERATOR FOR REDUCED TONAL AUDIBILITY

TECHNICAL FIELD

The invention relates to controlling a wind turbine generator for reduced tonal audibility.

BACKGROUND TO THE INVENTION

Wind turbine generators include power converters that are used to provide a required output, which must account for plant operating parameters, grid conditions and instantaneous demand, from generated power, which is variable in dependence on instantaneous operating conditions.

In some power converters, three-phase generated power is fed to an array of switches that are operated using pulse-width modulated (PWM) control signals to provide a required output. The high-frequency switching of the control signals can create audible noise, in particular where harmonics of the PWM input are produced in the audible range.

The characteristics of the acoustic noise generated are dependent on the carrier frequencies of the control signals that are used to operate the switches of the power converter. In turn, the carrier frequencies may be influenced by both the properties of the generated power and the instantaneous output to be delivered.

Under certain operating conditions, the noise produced in the converter may become unacceptable. This is especially the case when the carrier frequency remains steady at a level that tends to produce harmonics at a corresponding constant frequency, which manifest as continuous monotone noise, or 'tones', emitted by the converter. Tones are known to be particularly stress-inducing for any individual within close proximity of the converter, and so are undesirable.

Some frequencies generate noise of significantly higher magnitude than is caused by neighbouring frequencies, a phenomenon that is analogous to resonance, and tonal audibility or tonality is a measurement of the amplitude of noise at a particular frequency compared with at its neighbouring frequencies. One way to reduce tonal audibility is to vary the switching frequency of the converter over time to minimise the production of harmonics, although doing so can impact the performance of the converter.

It is against this background that the invention has been devised.

SUMMARY OF THE INVENTION

An aspect of the invention provides a method of controlling a wind turbine generator comprising an electrical generator and a power converter, the power converter comprising an electrical switch that is configured to process electrical power produced by the electrical generator. The method comprises: controlling an output from the switch using a variable pulse-width modulated control signal, thereby to control characteristics of output power from the power converter; acquiring sample data relating to an electronic signal within the wind turbine generator, wherein the sample data is used for controlling the wind turbine generator; and dynamically adjusting a frequency at which the sample data is acquired to synchronise data acquisition with a carrier frequency of the control signal.

The variable pulse-width modulated control signal reduces tonal audibility associated with the power converter compared with a control signal having a steady carrier frequency, also referred to as switching frequency. However, as noted above, varying the switching frequency of the control signal can impact the overall performance of the wind turbine generator, because such variation impacts the frequency content of other signals within the wind turbine generator, such as the output from the power converter.

To mitigate such adverse effects, sample data acquisition is synchronised with the varying frequency of the relevant control signal. For example, sampling of a generator-side component, such as the electrical generator, is synchronised with the varying frequency of a control signal supplied to a generator-side switch of the power converter. Similarly, sampling of a grid-side component such as the output from the power converter is synchronised with the switching frequency of a control signal delivered to a grid-side switch of the power converter.

By synchronising in this way, successive measurements can be taken at a consistent stage of the switching cycle of the relevant control signal, allowing feedback loop controllers to account properly for the frequency content of the measured signal upon which control is to be based, and therefore improve the performance of the wind turbine generator.

Synchronising sampling may comprise acquiring sample data at a rate that is an integer multiple of the carrier frequency of the control signal.

The method may comprise sampling the electrical signal of the wind turbine generator directly to produce raw data, and then acquiring the sample data by sampling the raw data at a rate that is lower than the rate at which the electrical signal is sampled and that is synchronised with the carrier frequency of the control signal. In such embodiments, the method may further comprise filtering the raw data prior to acquiring the sample data from the raw data, for example using a finite impulse response filter. This approach allows the raw electrical signal to be sampled at high frequency, and then optionally filtered, to produce high resolution measurements. As it may be impractical to synchronise high frequency measurements with the variable switching frequency of the control signal, sampling in two stages by sampling the raw data at a lower frequency that is synchronised with the control signal enables high resolution data to be extracted whilst maintaining synchronisation with the control signal switching frequency, in turn maintaining performance of the overall system. It is noted that the raw data may comprise a set of values, or alternatively may be in the form of a signal.

The electronic signal that is sampled may include one of the following: a current output from the electrical generator; a current output from the power converter; a voltage output from the electrical generator; and a voltage output from the power converter.

The method may comprise defining a sequence of frequency values to be applied to the carrier frequency of the control signal. The power converter may include multiple switches, each being controlled with a respective control signal, in which case sampling is synchronised with a carrier frequency of at least one of the control signals and a respective sequence may be defined for each control signal. Such methods may comprise applying a high-pass filter to the or each sequence. The or each sequence may be generated in advance of operating the wind turbine generator.

In some embodiments, the method comprises adjusting the carrier frequency of the control signal within a range associated with tonal audibility of the power converter.

The method may comprise maintaining a carrier frequency of the control signal above a threshold associated with tonal audibility of the power converter.

The method may comprise compensating for the varying acquisition rate in the control of the wind turbine generator.

The method may comprise acquiring sample data for multiple electronic signals within the wind turbine generator, in which case sampling of each signal is synchronised with the carrier frequency of the control signal. If there are multiple control signals controlling multiple switches, sampling of each electronic signal may be synchronised with a carrier frequency of a respective one of the control signals.

Another aspect of the invention provides a control system for controlling a wind turbine generator, the wind turbine generator comprising an electrical generator and a power converter, the power converter comprising an electrical switch that is configured to process electrical power produced by the electrical generator. The control system comprises a controller that is configured to generate a variable pulse-width modulated control signal for controlling an output from the switch of the power converter, thereby to control characteristics of output power from the power converter, and a sampling system that is configured to acquire sample data relating to an electronic signal within the wind turbine generator, the sample data being used for controlling the wind turbine generator. The sampling system is arranged to adjust a frequency at which sample data is acquired dynamically to synchronise data acquisition with a carrier frequency of the control signal.

The inventive concept also extends to a wind turbine system comprising at least one wind turbine generator and the control system of the above aspect.

It will be appreciated that preferred and/or optional features of the first aspect of the invention may be incorporated alone or in appropriate combination in the second aspect of the invention also.

BRIEF DESCRIPTION OF THE DRAWINGS

So that it may be more fully understood, the invention will now be described, by way of example only, with reference to the following drawings, in which.

DETAILED DESCRIPTION OF EMBODIMENTS OF THE INVENTION

As described below, embodiments of the invention provide methods for controlling a wind turbine generator to reduce tonal audibility without diminishing performance. To provide context for the invention, an example of a wind turbine generator 1 to which such methods may be applied is shown in FIG. 1.

Figure 1:
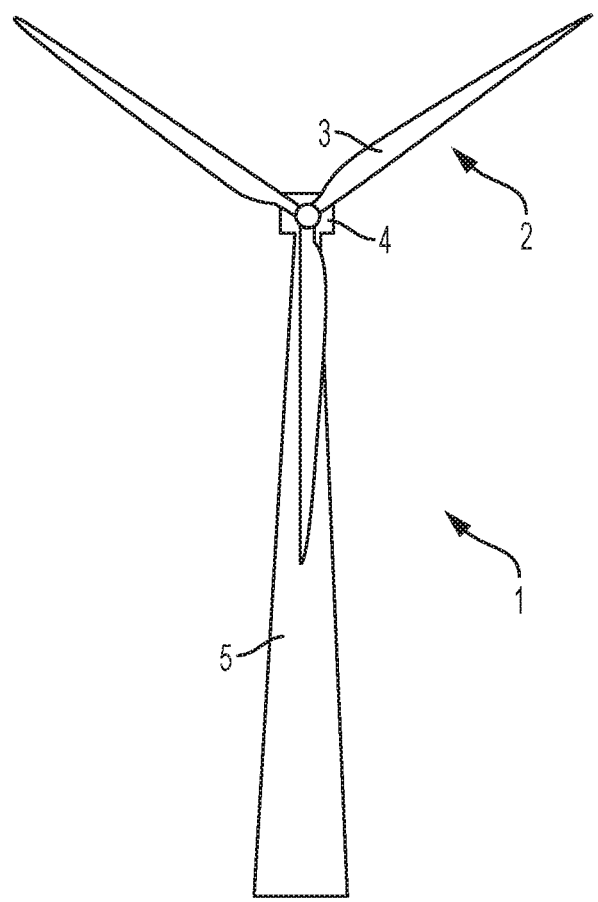
FIG. 1 is a schematic diagram of a full-scale converter based wind turbine generator that is suitable for use with embodiments of the invention.

It should be appreciated that the wind turbine generator 1 of FIG. 1 is referred to here by way of example only, and it would be possible to implement embodiments of the invention into many different types of wind turbine systems.

The wind turbine generator 1 shown is a three-bladed upwind horizontal-axis wind turbine (HAVVT), which is the most common type of turbine in use. The wind turbine generator 1 comprises a turbine rotor 2 having three blades 3, the rotor 2 being supported at the front of a nacelle 4 in the usual way. It is noted that although three blades is common, different numbers of blades may be used in alternative embodiments. The nacelle 4 is in turn mounted at the top of a support tower 5, which is secured to a foundation (not shown) that is embedded in the ground.

The nacelle 4 contains a generator (not shown in FIG. 1) that is driven by the rotor 2 to produce electrical energy. Thus, the wind turbine generator 1 is able to generate power from a flow of wind passing through the swept area of the rotor 2 causing the rotation of the blades 3.

Figure 2:
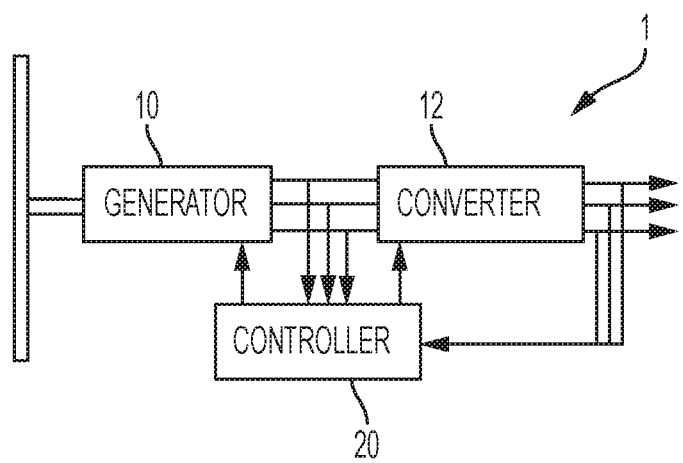
FIG. 2 is a block diagram of an architecture of the wind turbine generator of FIG. 1.

FIG. 2 is a block diagram representation of the architecture of the wind turbine generator 1 of FIG. 1. The example shown is representative only and the skilled reader will appreciate that the methods described below may be applicable to many different configurations.

Moreover, the components of the wind turbine generator 1 are conventional and as such familiar to the skilled reader, and so will only be described in overview.

As already noted, the wind turbine generator 1 comprises an electrical generator 10 that is driven by a rotor 2 to produce electrical power. The power produced in the electrical generator 10 is three-phase AC, but is not in a form suitable for delivery to a grid, in particular because it is typically not at the correct frequency or phase angle. This is because the frequency and angle of the generated power are determined, at least in part, by the speed of rotation of the rotor 2, which in turn is dependent on wind conditions.

Accordingly, the wind turbine generator 1 includes a power converter 12 to process the electrical power produced by the electrical generator 10 into a suitable output waveform having the same frequency as the grid and the appropriate phase angle. In general terms, therefore, the power converter 12 provides AC to AC conversion, which it achieves by feeding electrical current through an AC-DC converter followed by a DC-AC converter in series.

Figure 3:
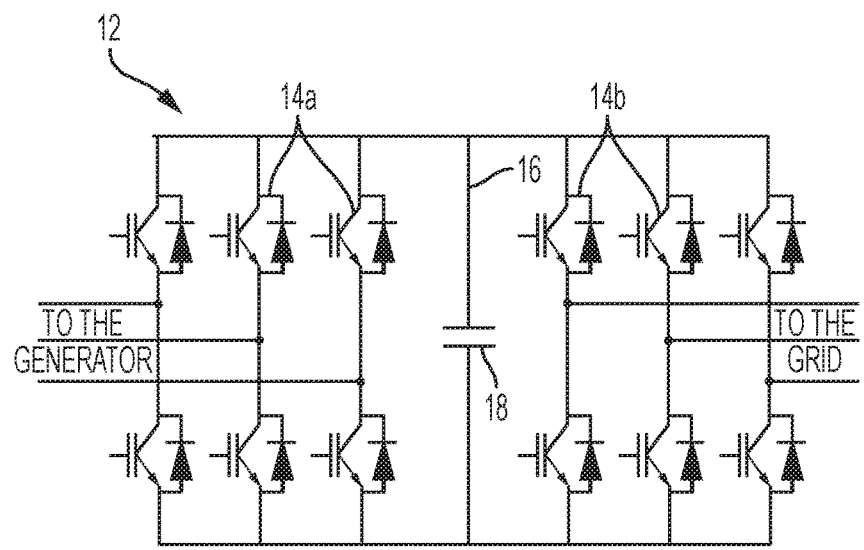
FIG. 3 is a schematic diagram showing an architecture of a converter of the wind turbine generator of FIG. 1.

An example of a suitable power converter 12 is shown in more detail in FIG. 3. The power converter 12 comprises an array of insulated gate bi-polar transistors (IGBTs) 14a, 14b, each of which outputs a voltage that is controlled using a respective PWM control signal, with the output voltage being proportional to a duty cycle of the control signal. The IGBTs 14a, 14b are arranged in two groups of six in a symmetrical configuration: a generator-side group 14a, which provides AC-DC conversion; and a grid-side group 14b, which provides DC-AC conversion. The two groups of IGBTs 14a, 14b are connected by a DC link 16 that includes a shunted capacitor 18 for smoothing the output from the generator-side IGBTs 14a.

Each phase of the input power received from the generator 10 is connected to a pair of opposed IGBTs 14a, which then connect to respective opposing branches of the DC link. Through appropriate control of the frequency and duty cycle of the PWM control signals that are used to control the outputs from the IGBTs 14a, a desired DC output can be delivered to the DC link from the generator-side IGBTs 14a.

At the grid side, the DC output supplied through the DC link is received by a respective pair of IGBTs 14b for each phase of the three-phase output. The DC signal delivered through the DC link can be reconstructed into a three-phase AC output of desired characteristics, to meet instantaneous demand, by controlling the PWM signals supplied to the grid-side IGBTs 14b appropriately.

Returning to FIG. 2, a control system 20 is provided that implements feedback-loop control for each component of the wind turbine generator 1 to control the output from the converter 12. The control system includes one or more controllers that act based on sample data obtained by a sampling system.

In FIG. 2, a single controller 20 is shown for simplicity. However, the skilled reader will appreciate that in practice it is more common to use distributed control systems, in which each element of the wind turbine generator 1 has a respective controller.

The sampling system probes the wind turbine generator 1 at various stages to sample electrical signals that are indicative of current or voltage, for example. In particular, the sampling system gathers raw data relating to the current and voltage of the outputs from the electrical generator 10 on the generator side, and from the power converter 12 on the grid side. As shall be described later, this raw data is processed into sample data, which is then passed to the controller. The controller uses the sample data to determine operating parameters for the wind turbine generator 1. For example, the duty cycle of the control signals for the generator-side IGBTs 14a of the power converter 12 may be determined, at least in part, based on the instantaneous properties of the generated power supplied by the electrical generator 10.

To re-iterate, the physical hardware that has been described up to this point is conventional, and is included to provide context for the invention. With that context established, an approach for reducing tonal audibility shall now be described.

As noted above, a common cause of tonal audibility is the switching of PWM control signals that are used to control IGBTs or the like in a power converter at a steady frequency that produces harmonics within a critical frequency band, i.e. within the audible range. One way to combat this is to vary the carrier frequency of the PWM control signals, which in turn avoids production of harmonics associated with tonal noise.

It has been shown previously that varying the carrier frequency of the PWM control signals randomly—a technique known as 'random pulse width modulation', or 'random PWM'—provides effective reduction of tonal audibility from power converters. As the skilled reader will be aware, conventional controllers are capable of implementing random PWM, and so this is not described any further here.

It is noted that random PWM need not to be truly random, and the term is used to encompass a range of ways in which the carrier frequency of a PWM signal may be varied, for example according to a repeating pattern.

It has previously been difficult to implement random or otherwise variable PWM into power generation systems, as the varying switching frequency causes problems with feedback loop control of system components, and in particular with interfacing to components of the system such as the electric generator 10. This is primarily due to the fact that sampled data PWM converters must align the sampling of feedback signals with the period of the PWM carrier signal to achieve high performance.

It is noted that the output from the power converter 12 contains fluctuations as a result of the switching of the PWM control signals. Although these fluctuations are insignificant in terms of external grid requirements, for example, if they are not accounted for properly in the feedback loop control they can cause errors. In other words, it has previously been difficult to identify and compensate for the effect of the randomly varying switching rate of the IGBT control signals in the sampling data.

To overcome this problem, in embodiments of the invention the rate at which the sampling system acquires sample data from the wind turbine generator 1 is varied in the same manner as the carrier frequency of the PWM control signals, so that the sample data acquisition remains synchronised with the switching of the signals. This means that the sample data can be processed to account for the states of the IGBT control signals at the moment when each sample was taken, thereby preventing fluctuations within the electrical signals of the wind turbine generator 1 from causing control errors.

Figure 4:
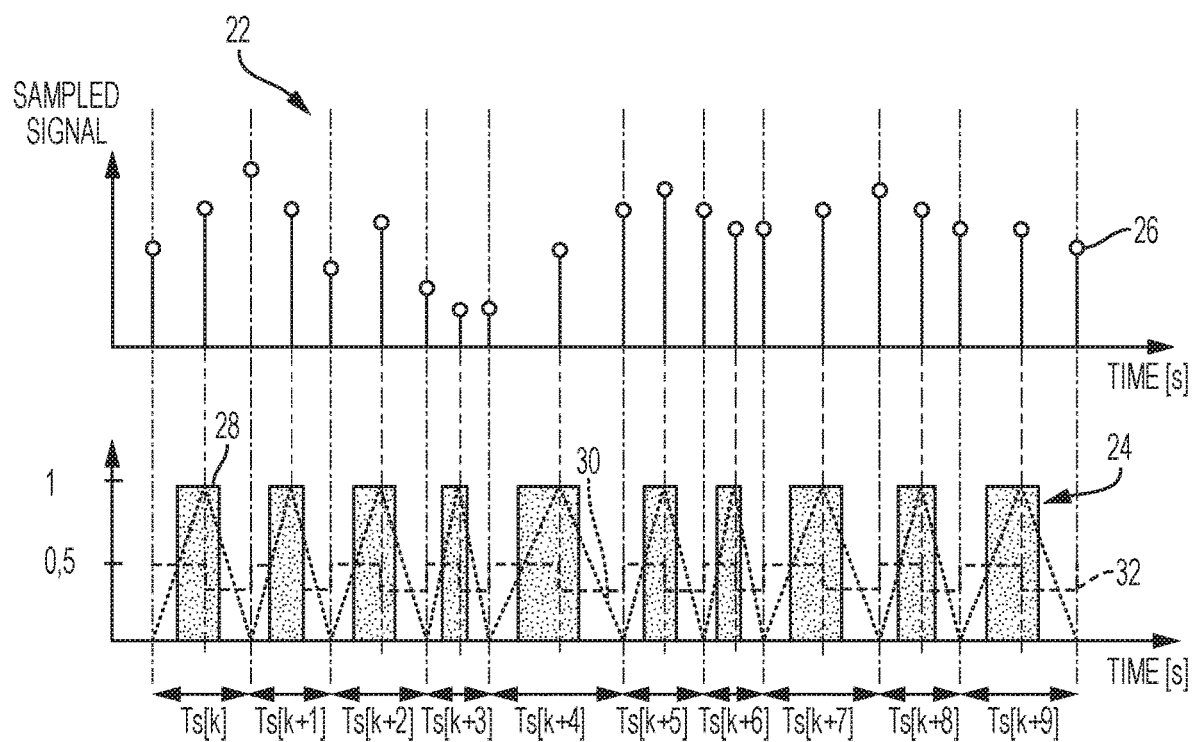
FIG. 4 is a graph showing a first representative random PWM control signal in parallel with a corresponding sampling signal.

FIG. 4 is a graph that illustrates a scenario in which the carrier frequency of a PWM control signal is varied, and where a sampling signal must respond accordingly. The figure shows a high frequency sampling signal 22 that obtains data relating to an electrical signal within the wind turbine generator 1 above a random PWM control signal 24 that is to be supplied to an IGBT 14a, 14b of the power converter 12.

The sampling signal 22, shown uppermost in FIG. 4, consists of a sequence of twenty one measurements 26 of the raw electrical signal, and FIG. 4 shows an arbitrary variation in the magnitude of the raw signal.

The PWM control signal 24, shown beneath the sampling signal, comprises a series of ten pulses 28 of randomly varying wavelength, each pulse 28 being represented by a respective rectangular block on the graph. The carrier frequency of the PWM control signal is represented by a triangular wave 30 that is superimposed over the blocks representing the pulses 28. It is noted that there is one pulse 28 for each wave of the carrier signal 30. As the pulses 28 are of varying wavelength, the wavelength—and, in turn, the frequency—of the carrier signal 30 varies in a complementary manner. The frequency changes act to reduce tonal audibility from the power converter 12.

It will be appreciated that this is a simplified example, and in practice a randomly varying carrier frequency may change much more dramatically than the example shown in FIG. 4. Typically, the carrier frequency 30 may vary by 10-20% of an average value.

The duty cycle of the control signal 24 is represented by a square wave 32 that updates twice per cycle of the carrier frequency. Accordingly, the graph shows a change in duty cycle 32 at the start of each new wave of the carrier signal 30, and another change in duty cycle 32 at the peak of each wave. Provided the carrier frequency 30 remains sufficiently high, the duty cycle 32 determines the average voltage output from the IGBT 14a, 14b to which the control signal 24 is supplied, and so changing the carrier frequency 30 does not affect performance in this respect. The only effect on the output will be to alter the frequency of the fluctuations within the control signal 24.

In the example shown in FIG. 4, a sample 26 is taken at times corresponding with each peak and trough of the carrier signal 30 of the control signal. The frequency of the sampling signal 22 is therefore double that of the control signal 24, in that there are two samples 26 for every cycle of the control signal 24. This ratio is maintained against a varying control signal carrier frequency 30 by controlling the frequency of the sampling signal 22 accordingly, as is clear from the varying intervals between successive samples 26 in FIG. 4.

It is noted that the sampling signal 22 may have a much higher frequency relative to the carrier frequency of the control signal 24 than is suggested by FIG. 4. Alternatively, the sampling frequency may be equal to or lower than the control signal carrier frequency; provided that the two frequencies are synchronised, which is ensured by selecting a sampling frequency that is an integer multiple of the PWM carrier frequency, or the carrier frequency is an integer multiple of the sampling frequency. This ensures that sampling is synchronised with switching of the IGBT control signal, in that samples 26 are taken at regular points on the switching cycle.

The example shown in FIG. 4 shows a control signal carrier frequency that changes from one cycle to the next, with corresponding changes in the sampling frequency to provide effective reduction of tonal audibility. However, the changes in carrier frequency may be more subtle than in the illustrated example, for example changing every 10 cycles. However the control signal 24 may vary, the changes in sampling frequency are sufficiently dynamic and responsive to ensure that synchronisation is maintained.

To simplify control of the power converter 12, all control signals may have the same carrier frequency at all times; even though they will have different duty cycles. In particular, the generator-side control signals will have a different duty cycle to the grid-side control signals, since each group of IGBTs 14a, 14b performs a fundamentally different action. Using the same carrier frequency in all control signals helps to ensure that sampling is synchronised with the switching of the IGBTs 14a, 14b.

More usually, however, different carrier frequencies may be used for each side of the power converter 12: one frequency for the grid-side IGBTs 14b, and another for the generator-side IGBTs 14a, creating two time domains within the wind turbine generator 1. This allows the carrier frequency to be optimised for the specific requirements of each side of the power converter 12, for example to account for filter resonances and grid compliance requirements on the grid side. The frequency at which each side of the wind turbine generator 1 is sampled is adjusted accordingly. For example, sampling of the output from the power converter 12 should be synchronised with the switching of the grid-side IGBT control signals.

It is noted that other components of the wind turbine generator 1 are typically controlled using signals having a carrier frequency at a third, constant level. This defines a third time domain within the wind turbine generator 1.

In the example described above with reference to FIG. 4, the sampling signal 22 may correspond to the actual sampling of electrical signals such as the generated current, to produce raw data. However, varying the rate at which the raw data is collected may be impractical.

An alternative approach is to sample the electrical signals at a continuous rate that is much higher than usual, for example up to 400 kHz, to produce high resolution raw data, and then sample the raw data at a lower rate that is synchronised with the carrier frequency of the relevant PWM control signal. For example, the raw data may be sampled at around 8 kHz. In this embodiment, the sampling signal shown in FIG. 4 corresponds to the low rate sampling of the raw data. Therefore, in the context of this description acquiring sample data can mean either sampling electrical signals directly, or sampling raw data.

The latter approach in which the raw data is sampled is straightforward to implement in post-processing of the captured data, and allows the rate at which raw data samples are taken to be set at a level at which they will not contribute to noise. Acquiring the sample data in this way also avoids the need for the sample data acquisition to be perfectly synchronised with the IGBT switching in real-time.

Typically, the raw sample data is filtered, for example to remove high frequency noise from the measurements or to reduce electrical switching noise originating from the IGBTs 14a, 14b. Finite impulse response filters have been found to be particularly effective for this purpose. Once the raw sample data has been filtered, the filtered data is then sampled at a lower rate that is synchronised with the IGBT control signal switching, to provide the final measurements that are used in the feedback look control of the wind turbine generator 1 components.

Instead of storing the raw data for subsequent sampling, it is also possible to sample a signal produced by filtering the raw sample data directly. In this approach, the filtered signal is considered to be the 'raw sample data'.

Figure 5:
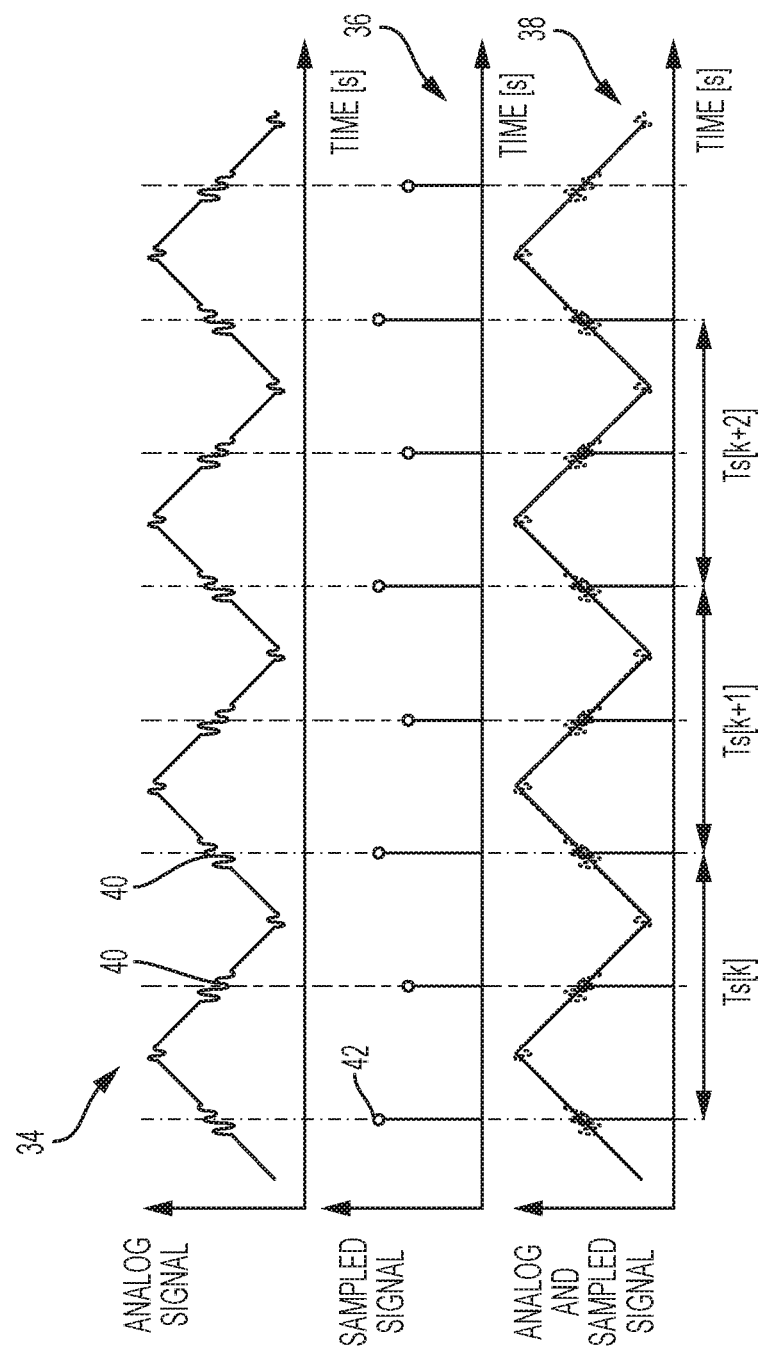
FIG. 5 is a graph showing a second representative random PWM control signal in parallel with a corresponding sampling signal.

FIG. 5 illustrates an implementation of this approach. The figure includes three graphs: a raw analogue signal 34, for example the current output from the electrical generator 10, shown uppermost; a steady sample signal 36 immediately beneath; and a combined graph including a filtered signal 38 superimposed on the raw signal 34, alongside the sample signal 36.

The raw signal 34 is steady-state in this simplified example, but contains ripples 40 representing the above mentioned fluctuations that arise due to switching of the control signals or other sources of noise. Individual measurement samples 42 of the sample signal 36 coincide with the moments in time at which the ripples 40 arise, and so each measurement 42 will indicate a slightly different magnitude for the raw signal 34; even though a steady-state signal should produce consistent measurements. This illustrates how low frequency sampling can be sensitive to such fluctuations.

The lowermost graph shows in dashed lines a filtered version 38 of the analogue signal, in which the ripples 40 have been removed. When this filtered signal 38 is sampled, the measurements 42 will be consistent and will therefore provide a true indication of the average value of the raw signal 34 on which to base feedback loop control. This illustrates how sampling a filtered signal 38, rather than sampling the raw analogue signal 34 directly, helps to provide more accurate data.

There are various ways in which the control signal carrier frequency may be randomised. For example, a random number generator with seeding may be used online to provide real-time updates for the PWM frequency. Alternatively, a random sequence of frequency values may be calculated offline in advance. More than one sequence may be determined in advance to be used in respective different operating modes. The latter approach has the benefit of reducing consumption of processing resources within the controller, and also allows for optimisation of the sequence of values to ensure that there is sufficient variation to provide effective cancellation of tonal audibility.

As already noted, the variation in carrier frequency may not be truly random, and may instead utilise a repeating sequence of random values, for example. Another possibility is to use a discrete set of frequency values, and switch between those values either randomly or according to a defined sequence. For example, it has been found that there is no loss in reduction of tonal audibility if at least five values are used.

For all types of randomisation, the resulting frequency values can be constrained so as to satisfy requirements for features such as a time distribution function, frequency spectra and time drift, all of which contribute to the reduction in tonal audibility that can be achieved.

The variation in carrier frequency of the control signals may be constrained by applying a high-pass filter to the sequence of frequency values. This reduces the cumulative drift of the control signal relative to a steady PWM signal, and so minimises the amount by which the sample data acquisition rate must be adjusted to maintain synchronisation. However, heavy filtering tends to reduce the effectiveness of varying the PWM frequency for reducing tonal audibility, and so a balance must be struck between these considerations.

The skilled reader will appreciate that the controller requires updating for it to be able to handle the varying sample time of the sample data on which it is to base control of the components of the wind turbine generator 1. This includes supplying the relevant sample rate to the controller so that it can be taken into account.

In this embodiment, the controller operates according to a state space model, and so a transformation must be applied to map the continuous filters of the model to the time variable sample data.

The continuous filter can be represented in state space notation as follows:

$$\frac{dx}{dt} = Ax + Be$$
$$u = Cx + De$$

Where 'e' is the input and 'u' is the output. This filter can be transformed into its discrete counterpart using the Tustin transformation, which results in below equations:

$$x(n) = A_d(n) \times (n-1) + B_d(e(n) + e(n-1))$$

$$U(n) = Cx(n) + De(n)$$

$$A_d(n) = \operatorname{inv}(I - 0.5T_s(n)A)0.5T_s(n)B$$

$$B_d(n) = \operatorname{inv}(I - 0.5T_s(n)A)0.5T_s(n)B$$

Where $A_d(n)$ and $B_d(n)$ are constants in a fixed sample rate domain.

The skilled reader will appreciate that an inverse matrix computation is needed to calculate the new filter coefficients from these equations. This calculation is often relatively computer intensive. However, typically first order filters are used in the controller, in which the matrix inversion is reduced to a simple division, and so the computation time is minimised.

Moreover, if only a few selected discrete frequencies are used, it is possible to calculate all the filter parameters beforehand.

The skilled person will appreciate that modifications may be made to the specific embodiments described above without departing from the inventive concept as defined by the claims.

The invention claimed is:

1. A method of controlling a wind turbine generator comprising an electrical generator and a power converter, the power converter comprising an electrical switch that is configured to process electrical power produced by the electrical generator, the method comprising:
controlling an output from the electrical switch using a variable pulse-width modulated control signal, thereby to control characteristics of output power from the power converter;
acquiring sample data relating to an electronic signal within the wind turbine generator, wherein the sample data is used for controlling the wind turbine generator; and
dynamically adjusting a frequency at which the sample data is acquired to synchronize data acquisition with a carrier frequency of the control signal.

2. The method of claim 1, wherein synchronizing sampling comprises acquiring sample data at a rate that is an integer multiple of the carrier frequency of the control signal.

3. The method of claim 1, comprising sampling the electrical signal of the wind turbine generator directly to produce raw data, and then acquiring the sample data by sampling the raw data at a rate that is lower than the rate at which the electrical signal is sampled and that is synchronized with the carrier frequency of the control signal.

4. The method of claim 3, comprising filtering the raw data prior to acquiring the sample data from the raw data.

5. The method of claim 4, comprising filtering the raw data using a finite impulse response filter.

6. The method of claim 1, wherein the electronic signal that is sampled is one of the following: a current output from the electrical generator; a current output from the power converter; a voltage output from the electrical generator; and a voltage output from the power converter.

7. The method of claim 1, comprising defining a sequence of frequency values to be applied to the carrier frequency of the control signal.

8. The method of claim 7, comprising applying a high-pass filter to the sequence.

9. The method of claim 7, wherein the sequence is generated in advance of operating the wind turbine generator.

10. The method of claim 1, comprising adjusting the carrier frequency of the control signal within a range associated with tonal audibility of the power converter.

11. The method of claim 1, comprising maintaining the carrier frequency of the control signal above a threshold associated with tonal audibility of the power converter.

12. The method of claim 1, comprising compensating for a varying acquisition rate in the control of the wind turbine generator.

13. The method of claim 1, wherein the power converter comprises a plurality of switches, and wherein the method comprises controlling an output from each electrical switch using a respective variable pulse-width modulated control signal, and synchronizing data acquisition with a carrier frequency of at least one of the control signals.

14. The method of claim 1, comprising acquiring sample data relating to a plurality of electronic signals within the wind turbine generator.

15. A control system for controlling a wind turbine generator, the wind turbine generator comprising an electrical generator and a power converter, the power converter comprising an electrical switch that is configured to process electrical power produced by the electrical generator, the control system comprising:
a controller that is configured to generate a variable pulse-width modulated control signal for controlling an output from the switch of the power converter, thereby to control characteristics of output power from the power converter; and
a sampling system that is configured to acquire sample data relating to an electronic signal within the wind turbine generator, the sample data being used for controlling the wind turbine generator, wherein the sampling system is arranged to adjust a frequency at which sample data is acquired dynamically to synchronize data acquisition with a carrier frequency of the control signal.

16. A wind turbine system, comprising:
at least one wind turbine generator, comprising:
- an electrical generator; and
- a power converter, the power converter comprising an electrical switch that is configured to process electrical power produced by the electrical generator; and a control system, comprising:
- a controller that is configured to generate a variable pulse-width modulated control signal for controlling an output from the switch of the power converter, thereby to control characteristics of output power from the power converter; and
- a sampling system that is configured to acquire sample data relating to an electronic signal within the wind turbine generator, the sample data being used for controlling the wind turbine generator, wherein the sampling system is arranged to adjust a frequency at which sample data is acquired dynamically to synchronize data acquisition with a carrier frequency of the control signal.

\* \* \* \* \*